April 28, 1936.  H. C. BATES  2,038,629
PIPE JOINT
Filed June 7, 1934
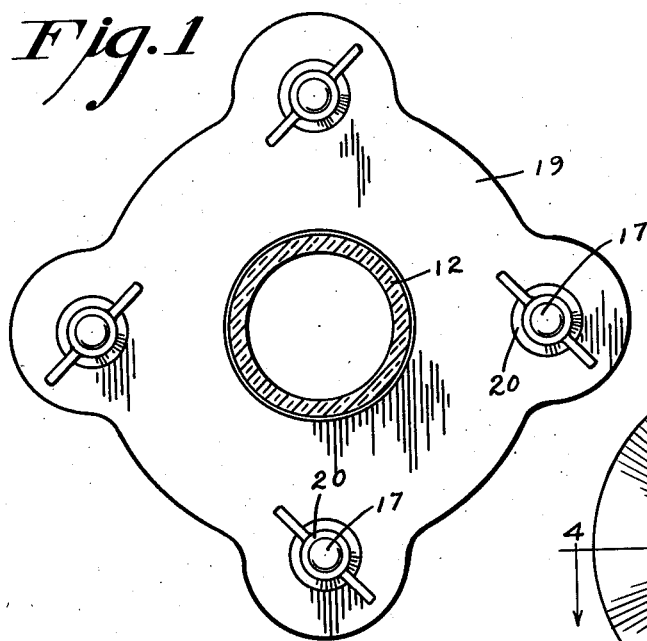
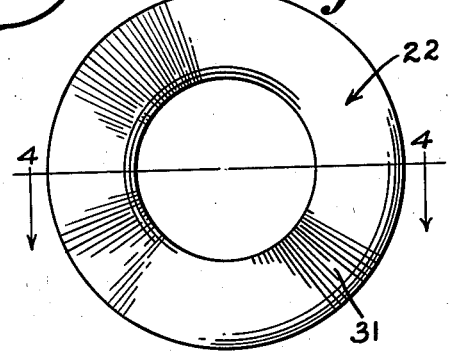
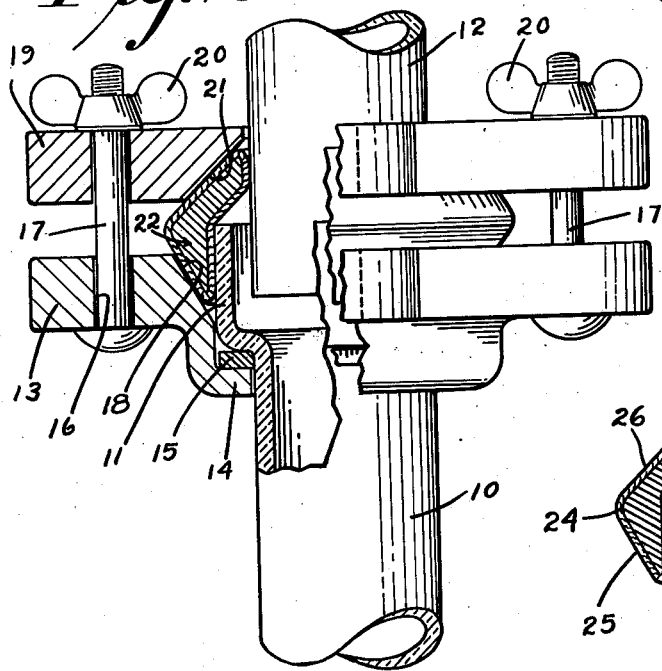
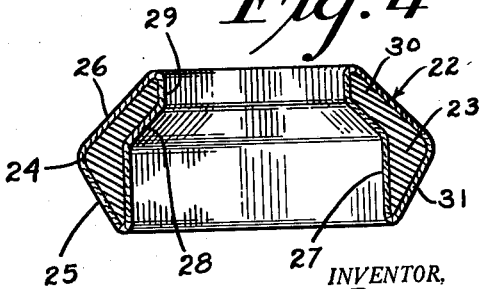
INVENTOR,
H. CLIFFORD BATES
BY
ATTORNEYS.

Patented Apr. 28, 1936

2,038,629

UNITED STATES PATENT OFFICE 2,038,629

PIPE JOINT

Harry Clifford Bates, Corning, N. Y., assignor to Corning Glass Works, Corning, N. Y., a corporation of New York Application June 7, 1934, Serial No. 729,490

1 Claim. (Cl. 285—134)

This invention relates to pipe joints and more particularly to couplings for glass lines.

Due to its transparency, resistance to corrosion, and its smooth surfaces, glass pipe is susceptible to use in widely divergent fields. For instance, it is known that metal pipes become coated with mineral deposits which after a time become so thick that the capacity of a metal pipe line is greatly reduced and as a consequence its utility is impaired. Moreover, metal pipes do not possess the resistance to chemical attack nor the transparency which is characteristic of glass piping. The major difficulty encountered in using glass piping, however, is the coupling of the lengths together for, where it is a relatively simple matter to cut threads on the ends of metal pipes, such a procedure is practically impossible when the pipe is composed of glass. As a result glass pipe has not found wide acceptance in the industries and elsewhere and consequently the many advantages incident to the use of glass pipe have not been heretofore available.

Pipe couplings of many types have been suggested but have been found unsuitable when applied to glass pipes as they usually tended to produce unequal strains in the glass with the result that breakage would occur.

The object of the present invention is a pipe coupling which will effectively prevent leakage and at the same time will avoid introducing strains in or otherwise injuring a glass pipe which would cause breakage.

The above and other objects may be accomplished by employing my invention, which embodies among its features a gasket comprising a core of slightly flexible material which is covered with a cushioning substance which in turn is impregnated with a suitable substance which will resist the passage of liquid therethrough without injuring a glass surface.

In the drawing:

Fig. 1 is a plan view of a pipe coupling constructed in accordance with my invention;

Fig. 2 is a side view partly in section of Fig. 1;

Fig. 3 is a plan view of the gasket which I employ, and

Fig. 4 is a sectional view taken on the line 4—4 of Fig. 3.

Referring to the drawing in detail, a length of glass pipe 10 is provided at one end with a hub 11 into which is loosely fitted the adjacent end of a length of glass pipe 12. A coupling flange 13 surrounds the hub 11 and is provided with an inwardly extending flange 14 for engagement with a cushion 15 which rests against the shoulder formed at the junction of the pipe 10 and hub 11. The coupling flange 13 is pierced at intervals with openings 16 for the reception of clamping bolts 17 and the inner face 18 of the coupling flange 13 tapers inwardly toward the flange as clearly shown in Fig. 2. Surrounding the pipe 12 near the end which enters the hub 11, is a coupling flange 19 which, like the flange 13, is pierced at spaced intervals to receive the bolts 17, and threaded on the ends of the bolts are thumb screws 20 by means of which the flanges 13 and 19 may be advanced toward one another. The inner face 21 of the flange 19 is inclined in a direction opposite the inclination of the face 18 to form in conjunction therewith a chamber for the reception of my improved gasket 22, which will be more fully hereinafter described.

The gasket 22, above referred to, comprises an annular core 23 of a slightly flexible material, such as lead or rubber, the exterior of which tapers from a toric portion 24 toward opposite ends to form inclined or wedge shaped faces 25 and 26 which are substantially parallel to the tapered faces 18 and 21 when the gasket is in position between the flanges 13 and 19. As shown in Figs. 2 and 4, the inner face 27 of the core lies concentric about its axis and terminates in a tapered position 28, which merges into a face 29 which is concentric with the face 27 but of lesser diameter, thus forming a substantially frustro conical hollow body from the base of which projects an inwardly extending flange 30 of lesser thickness than the body 23. The core thus formed is covered with a suitable cushion 31 which, in the present instance, consists of an asbestos string impregnated with graphite which is wound about the core 23 as illustrated. Such gaskets have proven satisfactory when employed in contact with chemical substances, such as ammonia and zinc chloride, at pressures of from seventy pounds per square inch up to pressures of one-hundred-twenty pounds per square inch and at temperatures up to 150° F., it being understood that suitable longitudinal tieing devices (not shown) are necessary to prevent endwise slippage and separation of the joints when such pressures are employed.

In use, the coupling flanges 13 and 19 are assembled on the pipe sections 10 and 12 and around the gasket 22, as shown, with the inner face 27 of the gasket 22 adjacent the exterior of the hub 11 and the interior face 29 of the gasket adjacent the exterior of the pipe 12. Upon turning the thumb screws 20, the flanges 13 and 19 will be advanced toward one another, thus transmitting pressure on the tapered faces 25 and 26 of the gasket to cause the latter to be compressed tightly against the pipe and effectively seal the junction. By reason of the relatively loose fit of the pipe 12 within the hub 11 and the slight flexibility of the core 23 of the gasket 22, it is obvious that a flexible coupling of the pipes is obtained, which will readily accommodate itself to slight misalignment and expansion or construction without introducing leakage at the joint or excessive strain in the glass parts.

While in the foregoing there has been shown and described the preferred embodiment of my invention, it is to be understood that minor changes in the details of construction, combination, and arrangement of parts may be resorted to without departing from the spirit and scope of my invention as claimed.

What I claim is:

The combination with a length of pipe having a hub at one end and a length of pipe having one end entering the hub of a coupling which comprises an annular body having a tapered outer face surrounding the hub, an inwardly inclined flange on the body the inner and outer walls of which incline in substantially the same degree with relation to the axis of the body as the outer face of the body tapers but in a direction opposite the taper of the body, an annular concentric wall at the ends of and extending between the inner and outer faces of the flange for contacting with the pipe which enters the hub and means for compressing the body into tight contact with the hub and the concentric wall of the flange into tight contact with the pipe which enters the hub.

H. CLIFFORD BATES.